United States Patent [19]

Yaiko

[11] Patent Number: 5,202,144
[45] Date of Patent: Apr. 13, 1993

[54] POULTRY-DERIVED GROUND MEAT SUBSTITUTE AND ITS METHOD OF MANUFACTURE

[75] Inventor: Leonard Yaiko, Midlothian, Ill.

[73] Assignee: Griffith Laboratories Worldwide, Inc., Alsip, Ill.

[21] Appl. No.: 743,119

[22] Filed: Aug. 9, 1991

[51] Int. Cl.$^5$ ............................................. A23J 1/00
[52] U.S. Cl. ............................. 426/574; 426/644; 426/646; 426/657; 426/802
[58] Field of Search ............... 426/574, 644, 646

[56] References Cited

U.S. PATENT DOCUMENTS

| | | | |
|---|---|---|---|
| 3,615,584 | 10/1971 | Schlamb | 426/646 |
| 4,362,247 | 12/1982 | Rueda | 211/13 |
| 4,376,134 | 3/1983 | Kumar | 426/656 |
| 4,559,236 | 12/1985 | Okada | 426/643 |
| 4,612,203 | 9/1986 | Wong et al. | 426/589 |
| 4,615,899 | 10/1986 | Hunter et al. | 426/802 |
| 4,849,232 | 7/1989 | Baker et al. | 426/644 |
| 4,943,441 | 7/1990 | McCabe | 426/511 |

*Primary Examiner*—Jeanette Hunter
*Attorney, Agent, or Firm*—Laff, Whitesel, Conte & Saret

[57] ABSTRACT

A poultry-derived proteinaceous material suitable as a substitute for ground meat prepared by extracting salt-soluble proteinaceous material from poultry muscle, gelling and then grinding the extract.

10 Claims, No Drawings

POULTRY-DERIVED GROUND MEAT SUBSTITUTE AND ITS METHOD OF MANUFACTURE

BACKGROUND OF THE INVENTION

This invention relates generally to a proteinaceous material suitable as a meat substitute and to its preparation, and more particularly to a poultry-derived proteinaceous material which is both economically and characteristically desirable as a substitute for ground meat in various food preparations.

Many people prefer poultry over meat due to economic, and other considerations. There are numerous popular food products utilizing ground meat such as taco fillings, pizza toppings, spaghetti sauces, chili and sloppy joe. Those preferring poultry over meat would therefore consider it highly desirable to be able to provide poultry-derived substitutes for ground meat in these food products.

It is therefore an object of the present invention to present a process for the production of a poultry-derived proteinaceous material which is suitable as a meat substitute.

It is also an object of this invention to provide a process for the production of a poultry derived proteinaceous material which is economically advantageous and comparable in both in quality and texture to ground meat.

It is a further object of this invention to provide poultry-derived proteinaceous material which is suitable as a meat substitute.

Other objects and advantages of the present invention will appear hereinafter.

DETAILED DESCRIPTION OF THE INVENTION

For purposes of the present invention, the term "poultry" is to be understood to encompass domesticated birds raised for their food value, including chickens, ducks, geese, guinea, fowl, squab, turkeys, and domestically raised game birds (pheasant and quail). The term "meat" is to be understood to encompass all edible parts of muscle of cattle, sheep, swine, or goats that is skeletal. See *Food Science Sourcebook*, Second Edition, Part 1, by Herbert W. Ockerman, 1991.

In accordance with the present invention, salt soluble poultry proteinaceous material (myosin) is extracted by blending ground poultry muscle with an aqueous mixture of salt, phosphate, flavoring and coloring. In a preferred embodiment, the source of poultry protein is mechanically deboned poultry, which is described below.

Upon removing the whole muscle cuts from poultry, a significant amount of edible poultry muscle remains on the carcass. Such poultry muscle can be recovered as "mechanically deboned poultry" in a process which calls for grinding up the poultry carcass into a homogeneous mass which is forced against a plate with small orifices. The poultry proteinaceous material and marrow pass through the orifices, while all of the bones, tendons, and solid material are held back and discarded. The resulting poultry proteinaceous material is comparable to the consistency of peanut butter.

Thus, in accordance with this preferred embodiment of the invention, salt-soluble proteinaceous material is extracted by blending the deboned poultry with an aqueous mixture of salt, phosphate, flavorings, seasonings and coloring. The level of salt relative to mechanically deboned poultry should be in the range of about 0.1 to about 5.0 percent by weight salt to deboned poultry, and preferably about 0.5 to about 2.5 percent by weight. The flavorings which may be used include standard meat flavorings and seasonings. Caramel and other F, D, and C approved food colorings are used to give the resultant product a ground meat appearance, with caramel coloring presently preferred. The mixing time will vary depending upon the type of equipment used and the desired texture, but will typically be in the range of about 1 to 15 minutes and preferably about 3 to 10 minutes.

After blending, the proteinaceous material is cooked at a temperature of about 140° F. to 500° F., and preferably about 200°–300° F., until gelled and browned. Dry heat is the preferred means of cooking the product because dry heat deepens the color and gives the proteinaceous material a more desirable flavor. As the proteinaceous material cooks, it gels into a solid mass.

After cooking, the proteinaceous material (while it is still hot or after it has cooled) is run through a grinder plate to obtain the desired particle size and final texture.

The proteinaceous material may now be chilled or mixed with other seasoning or sauces to create the final products such as taco fillings, pizza toppings, spaghetti sauces, chili and sloppy joe.

EXAMPLES

The following examples are intended to be illustrative of the present invention and to teach one of ordinary skill how to make and use the poultry proteinaceous material. These examples are not intended to limit the invention or its protection in any way.

EXAMPLE 1

The poultry proteinaceous material is texturized and flavored by blending the following ingredients according to the procedure described immediately above:

| Ingredient | Weight (lbs.) |
| --- | --- |
| Extracted poultry proteinaceous material | 100.0000 |
| Salt | 1.000 |
| Dextrose | .5000 |
| Phosphate | .2500 |
| Beef-type flavoring | .2500 |
| Hydrolyzed vegetable protein | .2500 |
| Garlic Powder | .0625 |

The blended poultry proteinaceous material is then cooked, ground through a one-half inch plate, and chilled according to the above procedure.

EXAMPLE 2

Taco Mixture

The poultry proteinaceous material of Example 1 is mixed with the following ingredients to make a taco filling:

| Ingredient | Weight (lbs.) |
| --- | --- |
| Cooked poultry proteinaceous material | 4.80 |
| Water | .500 |
| Tomato paste | .300 |
| Taco seasoning | .306 |

All of the ingredients are blended and simmered to 180° F. The resulting product is aesthetically and organoleptically indistinguishable from its ground meat-based counterpart.

EXAMPLE 3

Chili

The poultry proteinaceous material of Example 1 is mixed with the following ingredients to create chili:

| Ingredient | Weight (lbs.) | (gms) |
|---|---|---|
| Cooked poultry proteinaceous material | 3.0 | |
| Crushed tomatoes in sauce | 3.5 | |
| Canned kidney beans | 3.0 | |
| Chopped onion | | 75.0 |
| Chili seasoning | | 35.0 |
| Ground cumin | | 1.50 |
| Granulated garlic | | 1.00 |

The onion is rehydrated before cooking. All of the ingredients are blended and simmered for one hour. The resulting product is aesthetically and organoleptically indistinguishable from its ground meat-based counterpart.

EXAMPLE 4

The poultry proteinaceous material of Example 1 is substituted or combined with ground meat and with appropriate seasonings or sauces to create final food products, these will likewise be aesthetically and organoleptically indistinguishable from their ground meat-based counterparts.

While the invention is described above in connection with preferred or illustrative embodiments, the embodiments are not intended to be exhaustive or limiting of the invention. Rather the invention is intended to cover all alternatives, modifications and equivalents included within its spirit and scope, as defined by the appended claims.

What is claimed is:

1. A process for preparing a poultry-derived proteinaceous material suitable as a ground meat substitute, comprising:
    a) extracting salt-soluble proteinaceous material from poultry;
    b) subjecting the extracted proteinaceous material to dry heat until gelled into a solid mass; and
    c) grinding the solid mass.

2. The process of claim 1 in which the poultry is mechanically deboned poultry.

3. The process of claim 1 in which flavorings, seasonings or colorings are added to the extracted proteinaceous material before it is gelled.

4. The process of claim 3 in which coloring is added and the coloring is caramel food coloring.

5. The process of claim 1 in which the extracted proteinaceous material is cooked at a temperature of about 140° F. to 500° F.

6. The process of claim 1 in which the extracted proteinaceous material is cooked at a temperature of about 200° F. to 300° F.

7. A process for preparing a poultry derived proteinaceous material suitable as a substitute for ground beef in foods typically containing ground-meat, comprising:
    a) extracting salt-soluble proteinaceous material from mechanically deboned poultry;
    b) flavoring and coloring the extracted proteinaceous material;
    c) subjecting the extracted proteinaceous material to dry heat until gelled or solidified into a solid mass; and
    d) grinding the solid mass.

8. A ground meat substitute prepared by the process comprising:
    a) extracting salt-soluble proteinaceous material from poultry;
    b) flavoring and coloring the extracted proteinaceous material;
    c) subjecting the extracted proteinaceous material to dry heat until gelled into a solid mass; and
    d) grinding the solid mass.

9. The product produced by the process of claim 7.

10. A food product comprising:
    a) the appropriate ingredients, less ground meat, for making a food product chosen from the group consisting of taco fillings, pizza toppings, spaghetti sauces, chili and sloppy joe; and
    b) a ground meat substitute prepared by:
        (i) extracting salt-soluble proteinaceous material from mechanically deboned poultry;
        ii) flavoring and coloring the extracted proteinaceous material;
        iii) subjecting the extracted proteinaceous material to dry heat until gelled or solidified into a solid mass; and
        iv) grinding the solid mass.

* * * * *